United States Patent [19]

Motoyama et al.

[11] Patent Number: 4,640,218
[45] Date of Patent: Feb. 3, 1987

[54] TABLET COATING APPARATUS

[75] Inventors: Shimesu Motoyama, Asaka; Masakazu Gotou; Hiromu Shirakawa, both of Tokyo; Takamoto Makino, Sakado, all of Japan

[73] Assignee: Freund Industrial Co., Ltd., Tokyo, Japan

[21] Appl. No.: 537,739

[22] Filed: Sep. 30, 1983

[30] Foreign Application Priority Data

Oct. 4, 1982 [JP] Japan ................................ 57-174273

[51] Int. Cl.$^4$ .......................... B05C 5/00; B05C 19/00
[52] U.S. Cl. ........................................ 118/19; 118/20; 34/138
[58] Field of Search .................... 118/19, 303, 20, 58; 34/138

[56] References Cited

U.S. PATENT DOCUMENTS

| | | | |
|---|---|---|---|
| 1,046,664 | 12/1912 | Smith | 34/138 X |
| 2,020,960 | 11/1935 | Pehrson et al. | 34/138 X |
| 2,483,630 | 10/1949 | Erisman | 34/138 X |
| 3,101,040 | 8/1963 | Lanz | 118/19 X |
| 3,834,347 | 9/1974 | Motoyama et al. | 118/19 |

Primary Examiner—John P. McIntosh
Attorney, Agent, or Firm—Kane, Dalsimer, Kane, Sullivan and Kurucz

[57] ABSTRACT

An apparatus for coating pharmaceutical tablets or the like with other material such as sugar or the like. The apparatus includes a cylindrical rotary drum in which the tablets are charged and tumbled, and at least one perforated area for ventilating hot gas or the like so as to dry the sugar coated on the tablets. The perforated area of the drum is covered by a baffle plate. The leading edge of the baffle plate is in contact with the inner surface of the drum, and the trailing edge of the baffle plate forms a ventilating opening through which the hot gas flows. The side edges of the baffle plate is provided with side plates. The ventilating opening is provided with a ventilating plate.

18 Claims, 17 Drawing Figures

TABLET COATING APPARATUS

BACKGROUND OF THE INVENTION

1. Field of the Invention

This invention relates to a tablet coating apparatus, more particularly, a tablet coating apparatus for coating pharmaceutical or food tablets or the like with a layer of other predetermined medical composition or sugar etc., which apparatus includes a rotatable coating pan or drum, the side wall of the drum has a ventilating area for feeding drying air.

2. Prior Art

Apparatus generally employed in the tablet coating art of this kind comprises a cylindrical container or drum mounted for rotary movement for the purpose of tumbling the tablets charged therein. The coating material in solution or suspension is introduced into the drum by a conventional means such as hydraulic spraying equipment. As the tablets tumble in the drum, they become coated with the fluid coating material. The coating or coated layer thus applied to tablets has to be thereafter dried to be hardened or solidified.

In a prior tablet coating apparatus, in which tablet or other granular raw material is sprayed with coating materials such as medical or sugar solution etc. and then the coated material is dried, heated air is blown onto the surface of the bed of tablets while the tablets to be coated are tumbled in a coating drum by rotating the drum. However, in this prior apparatus, although it is possible to dry only the tablets in the surface zone of the bed, the tablets in the inside and lower zones of the bed are insufficiently dried because the heated air can not reach to such zones. Therefore, it takes very long time to dry all of the tablets in the drum, and it is difficult to dry the tablets uniformly.

For eliminating these drawbacks, the applicant has provided a coating apparatus shown in FIGS. 1 and 2 which are disclosed in the Japanese Patent Publication No. 50-38713. This coating apparatus is provided with a ventilating and drying mechanism comprised of perforated areas 2 for ventilating air arranged axially in a plurality of circumferential positions or whole circumference of a rotary container or drum 1, an air supply conduit 3, an exhaust or suction duct 4, and an exhaust duct 5.

In this coating apparatus, the hot air blown into the drum 1 from the air supply conduit 3 is blown onto tablets 6 tumbled in the drum 1, and after passing through the bed of the tablets 6, the hot air is exhausted from the exhaust conduit 5 via the perforated area 2 and the duct 4.

Therefore, this coating apparatus is used as an excellent coating apparatus in a very wide range of field, because, in this coating apparatus, the hot air can contact uniformly with the tablets 6 not only in the surface zone but also in the inside and lower zones of the bed thereof, the heat efficiency is very high, it is possible to obtain homogeneous product dried with overall uniformity and with high productivity. Further, as the result of the high heat efficiency provided by this coating apparatus, it is possible to perform coating operation efficiently and in low cost, using an aqueous solution wherein coating material is dissolved or dispersed in the water (in this connection, refer to the Japanese Patent Publication No. 55-5491).

Moreover, in FIGS. 1 and 2, the reference numeral 7 is a rotary shaft for rotating the drum 1, 8 is a motor for driving the rotary shaft 7 via transmission means 9 such as a belt or a chain, 10 is a cylindrical portion which forms a charging opening through which tablets 6 to be coated are charged into the drum 1, and 11 is a cover for closing and opening the open end of the cylindrical portion 10. These cylindrical portion 10, cover 11 and said air supply conduit 3, exhaust conduit 5 do not rotate. The connecting portions between these non-rotating members and rotating members of the drum 1 are sealed by labyrinth type sealing means etc.

In such a coating apparatus, there are provided a plurality of ventilating through apertures having circular, rectangular or oblong or ellipse shapes in the perforated area 2 to increase the numerical aperture of the perforated area 2 in order to reduce the resistance to the ventilation through the perforated area 2. But, as a large quantity of coating materials are processed in the drum, the tablets or other granular materials being coated are clogged in the ventilating apertures to block the apertures. When the ventilating apertures are blocked, the smooth flow of the hot air is prevented to produce non-uniform ventilation, and the pressure loss of the ventilation system becomes increased or changed to make the coating operation instable. Further, it takes longer time for drying because of the reduction of the heat efficiency.

Alternatively, there is proposed other coating system, in which powdery raw material is coated in place of a portion of coating solution to reduce the energy for drying by using the above described coating apparatus. However, in this coating system, because the powdery material is leaked through the ventilating aperture and the leaked powdery material is escaped out of the system through the exhaust duct and conduit, not only a product having non-uniform components is produced, but also loss of expensive powdery raw material and environmental pollution occur.

Such problems arise not only in a conical shaped coating apparatus, but also in other coating apparatus, for example, a cylindrical coating apparatus disclosed in the Japanese Utility Model Publication No. 56-21466, or an onion or a pear shaped coating apparatus.

SUMMARY OF THE INVENTION

To eliminate the above described drawbacks of the prior art, it is an object of the present invention to provide a tablet coating apparatus which can dry the product with high heat efficiency and can prevent the leak of powdery material through ventilating areas and blocking of the ventilating areas.

For performing the above object, the tablet coating apparatus according to the present invention is provided with baffle or scoop means inside of the rotatable coating pan or drum at the positions where ventilating areas are covered by the baffle means, the leading edge of the baffle means which is positioned at the front side relative to the rotational direction of the drum is substantially abut on or adjacent to the inner wall surface of the drum, and one or both of the trailing edge and the side edges of the baffle means form a ventilating opening or openings between the baffle means and the inner wall surface of the drum. The baffle or scoop means scoop up or deflect the coating material being tumbled in the drum over the baffle means to tumble thereon, and then make the coating material fall down like a shower from the trailing edge and one or both of the side edges into the flow of hot air passing through the ventilating opening.

The baffle or scoop means is comprised of a flat plate, or an arcuate plate curved along the rotational direction of the drum, or non-planar plate bended in the axial direction of the drum etc. The baffle means may be provided with at least one side wall plate extended toward the inner wall or inside of the drum.

BRIEF DESCRIPTION OF THE DRAWINGS

Other objects and advantages of the present invention will become apparent from the following detailed description taken in conjunction with preferred embodiments shown in the accompanying drawings, in which.

DESCRIPTION OF THE PREFERRED EMBODIMENTS

Figure 3:
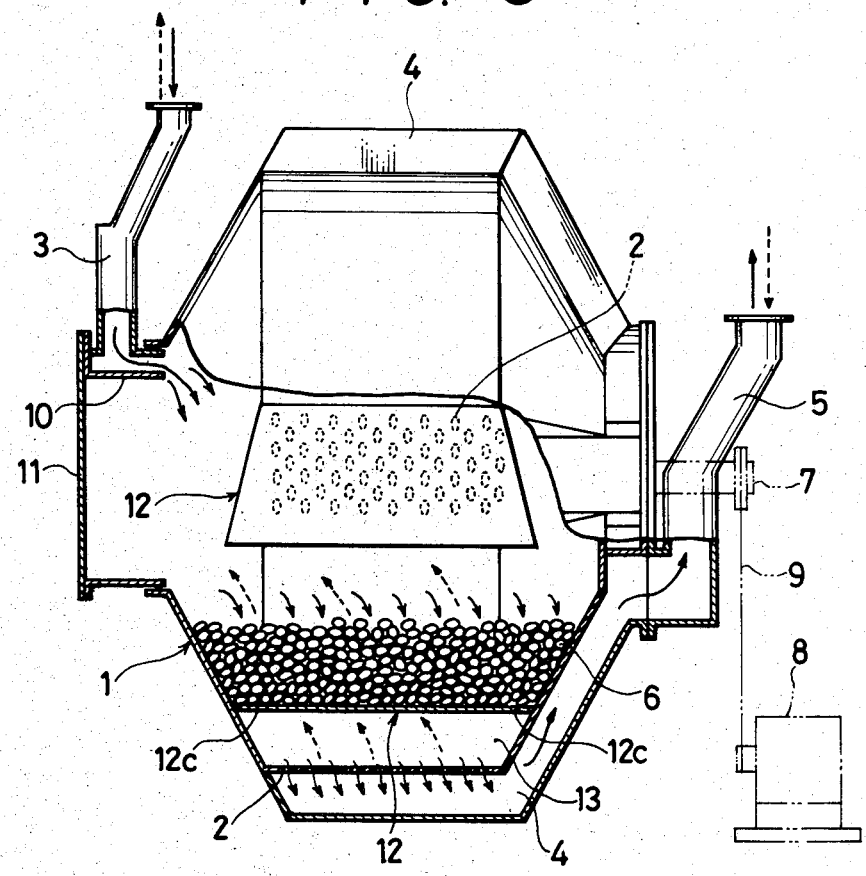
FIG. 3 is a side sectional view of a tablet coating apparatus according to one embodiment of the present invention shown partly in broken view.
Figure 4:
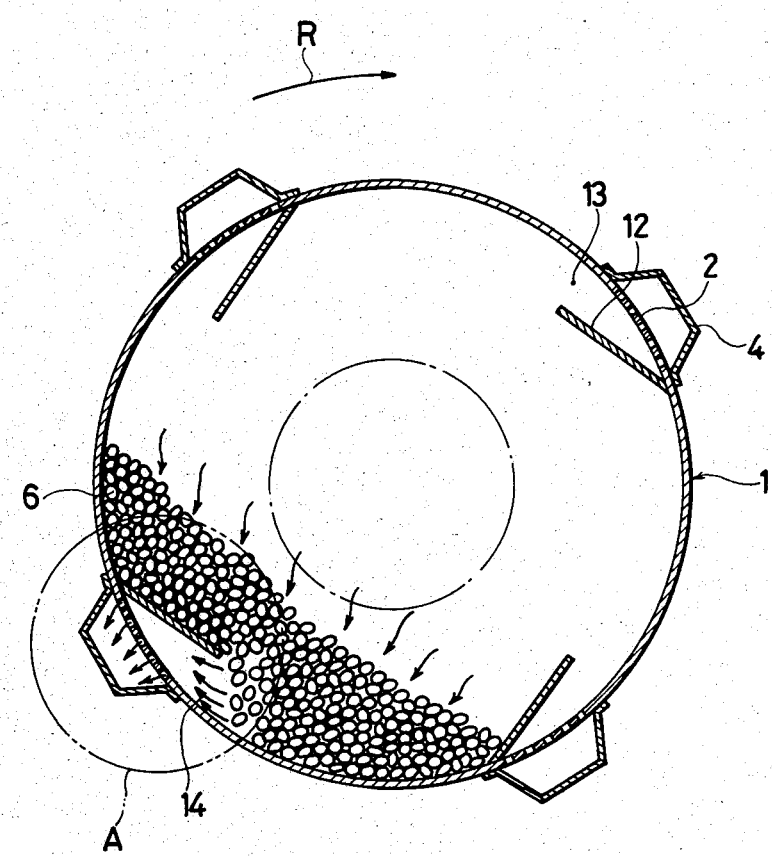
FIG. 4 is a general front sectional view of the apparatus shown in FIG. 3.
Figure 5:
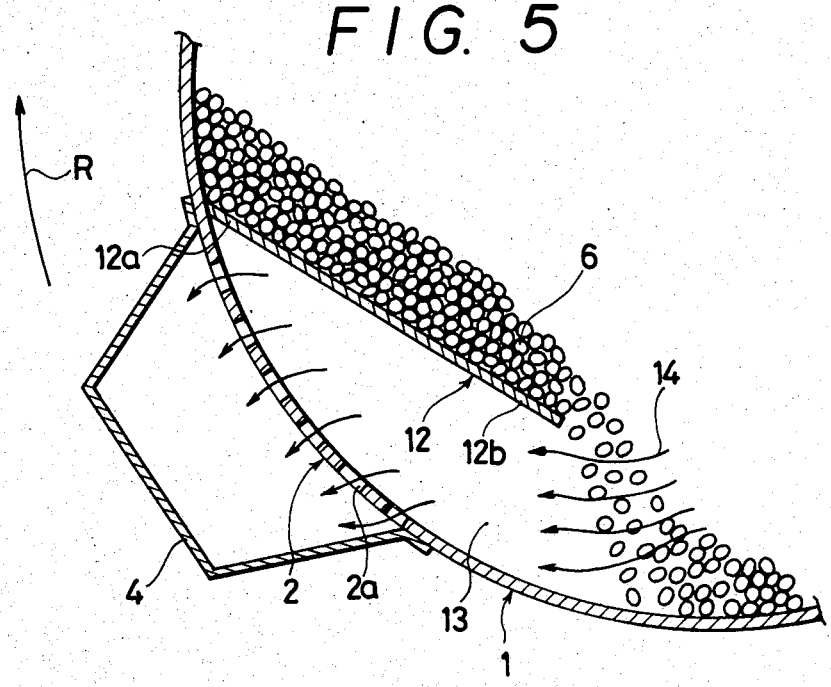
FIG. 5 is an enlarged sectional view of the portion A in the FIG. 4.

Referring now to the drawings, FIG. 3 is a partial side sectional view of one embodiments according to the tablet coating apparatus shown in FIG. 3, FIG. 4 is a general front sectional view of the apparatus shown in FIG. 5, FIG. 5 is an enlarged partial sectional view of the portion A of the FIG. 4.

Figure 1:
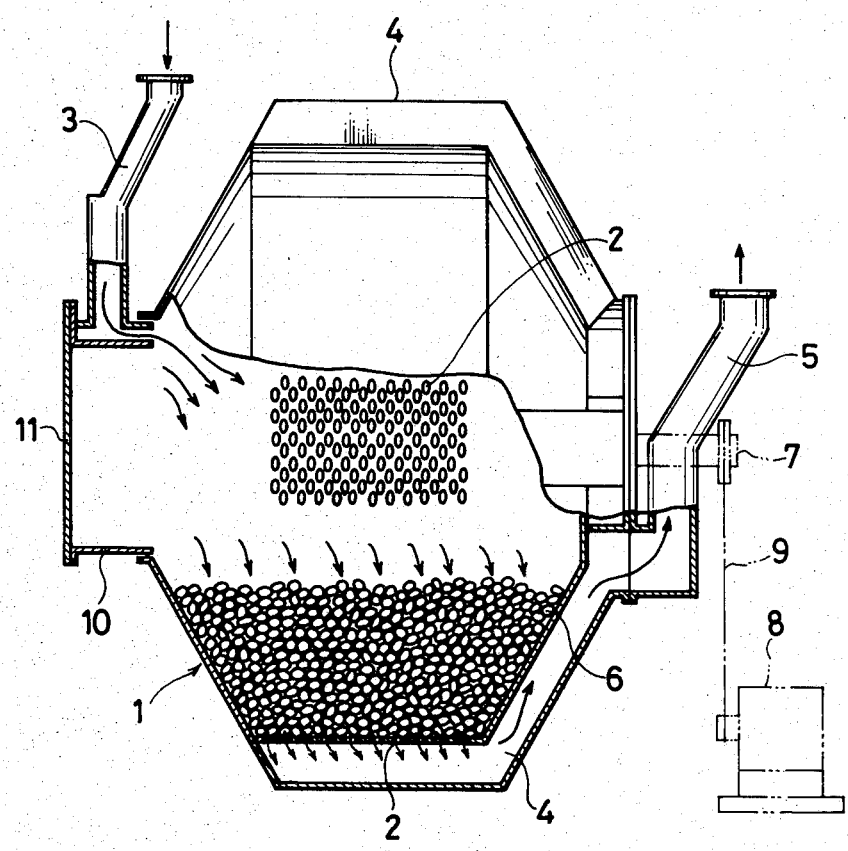
FIG. 1 is a side sectional view of a conventional tablet coating apparatus shown partly in broken view.
Figure 2:
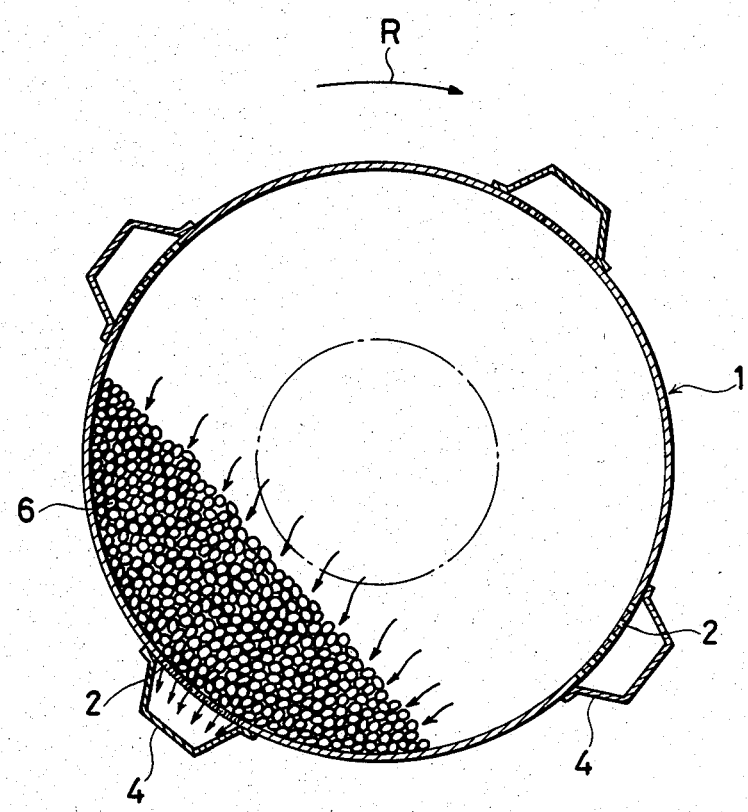
FIG. 2 is a general front sectional view of the apparatus shown in FIG. 1.

In this embodiment, the portions or members corresponding to those of the conventional structure shown in FIGS. 1 and 2 are depicted by the same reference numerals as the latter to avoid doubled description.

In the embodiment shown in FIG. 3, rotatable coating pan or drum 1 has a substantially conical side elevational shape. There is provided a baffle or scoop means or plate 12 in the drum 1 at a position to cover entirely each perforated area 2 of the drum 1. The leading edge 12a of the baffle plate 12 positioned at the front side relative to rotational direction R of the drum 1 makes line contact with the inner wall surface of the drum 1 along axial direction of the drum 1, and the trailing edge 12b of the baffle plate 12 forms a ventilating opening 13 between the plate 12 and the inner wall surface of the drum 1.

This baffle plate 12 scoops or deflects up at the leading edge 12a thereof, the coating materials such as tablets 6 or other granular materials tumbled along the inner wall surface of the drum 1 together with the rotational movement of the drum 1 to make the tablets 6 tumble on the plate 12 and drop like a shower by the gravity from the trailing edge 12b into the flow of hot gas 14 passing through the ventilating opening 13.

The baffle plate 12 in this embodiment is provided to cover each of the four perforated areas 2 angularly displaced to one another with a predetermined distance therebetween at the circumference of the drum 1. The leading edge 12a and/or both of the side edges 12c of the baffle plate 12 is fixed to the inner wall of the drum 1 by welding etc. By this arrangement, the tablets 6 are prevented from entering and leaking into the space between the leading edge 12a and both of the side edges 12c of the baffle plate 12 and the inner wall of the drum 1.

The operation of this embodiment is described in the following.

At first, the cover 11 of the cylindrical portion 10 of the coating drum 1 is opened, and the tablets 6 are charged into the drum 1 through the charging opening in the cylindrical portion 10 as raw materials to be coated. The drum 1 is rotated by the motor 8 via the belt 9 and the rotary shaft 7 to tumble the tablets 6 along the inner wall surface of the drum 1 to form bed of tumbled tablets 6. Then, a predetermined coating solution is sprayed onto the bed of tablets 6 from a spray mechanism (not shown) inserted into the drum 1 through the cylindrical portion 10. Thereby, the coating solution is coated on the tablets 6 to form coated layer thereof. Next, hot gas is blown into the drum 1 via the supply conduit 3, and flows through the bed of the tablets 6 coated with the coating solution to dry the tablets 6, and then exhausted out of the drum 1 through ventilating apertures 2a (FIG. 5) of the perforated area 2.

At that time, in this embodiment, as the baffle plate 12 is arranged to cover the perforated area 2 of the drum 1 from the inner side thereof and the leading edge 12a and both of the side edges 12c of the baffle plate 12 are substantially in smooth contact with the inner wall of the drum 1, the tablets 6 tumbled along the inner wall surface of the coating drum 1 by the rotary movement of the drum 1 are scooped or raised on the baffle plate 12 at the leading edge 12a thereof to be tumbled on the drum 1, and then dropped from the trailing edge 12b like a shower by gravity into the flow of hot gas 14 which passes the ventilating opening 13 toward the perforated area 2.

Therefore, according to this embodiment, the tablets 6 in the coating drum 1 are dried by the hot gas blown into the bed of the tablets 6 when they are tumbled on the inner wall surface of the drum 1 and the baffle plate 12. In addition to this drying effect, the tablets 6 contact with the hot gas 14 passing through the ventilating opening 13 in the normal direction relative to the dropping direction by gravity as shown in FIG. 5 when the tablets 6 are dropped from the trailing edge 12b of the baffle plate 12 into the flow of hot gas 14, thereby individual tablet 6 is dried efficiently at high speed by the perfect contact with the hot gas 14.

Namely, it is possible to eliminate the accumulated zone which is formed in the center of the bed of tablets which are given only tumbling movement, by dropping the tablets 6 like a shower by gravity from the trailing edge 12b of the baffle plate 12, the tablets 6 are dispersed and mixed. Therefore, by the complex action of the tumbling and showering movements, it is possible to prevent the irregularities of shapes of the coated tablets 6, generation of projected portions on the surfaces of the tablets 6, and non-uniformity of the thickness of the coated layer.

Further, according to this embodiment, even if a portion of the coating solution is replaced by powdery material for improving the drying effect, it is able to prevent the powdery material from leaking out of the coating drum 1 by selecting properly the surface area of the perforated area 2 covered by the baffle plate 12 and the sectional area of the ventilating opening 13. Of course, in this embodiment, since the perforated area 2 is covered by the baffle plate 12, it is possible to prevent the tablets 6 from clogging and blocking the ventilating apertures 2a of the perforated area 2. Therefore, pressure loss and pressure change are reduced, the operational condition becomes more stable, and it is suitable for automation.

Moreover, by taking into account the locus of movement of the tablets 6 when falling down like a shower at the position of the ventilating opening 13, and the inertia generated by the rotational movement of the drum 1, the surface area of the perforated area 2 covered by the baffle plate 12 is preferably made so that the baffle plate 12 covers the perforated area 2 completely by making the surface area of the baffle plate 12 larger than the surface area of the perforated area 2, therefore, the tablets 6 are dropped on the position backward of the rear end of the perforated area 2 for example by several tens millimeters relative to the rotational direction of the coating drum 1. In other way, the surface area of the baffle plate 12 may be smaller than that of the perforated area 2 to cover only a portion of the perforated area 2 by the baffle plate 12.

Furthermore, the sectional area of the ventilating opening 13 may be selected so that the locus of movement determined by the resultant of vector of the dropping direction and speed of the tablets 6 relative to the flowing direction and speed of the hot gas 14 at the position of the opening 13 is backward of the rear end position of the perforated area 2. According to many experiments performed by the present inventors, it is found that the height of the ventilating opening 13, namely the distance of the trailing edge 12b from the inner wall surface of the drum 1 is preferably in the range from one-fifth to one-fifteenth of the diameter of the coating drum 1.

In this embodiment, although the hot gas is supplied from the supply conduit 3 toward the exhaust conduit 5 as shown in solid line, the hot gas may be supplied from the conduit 5 and exhausted from the conduit 3 as shown in broken line in FIG. 3.

FIGS. 6–11 show several embodiments of the baffle plate for use in the present invention.

Figure 6:
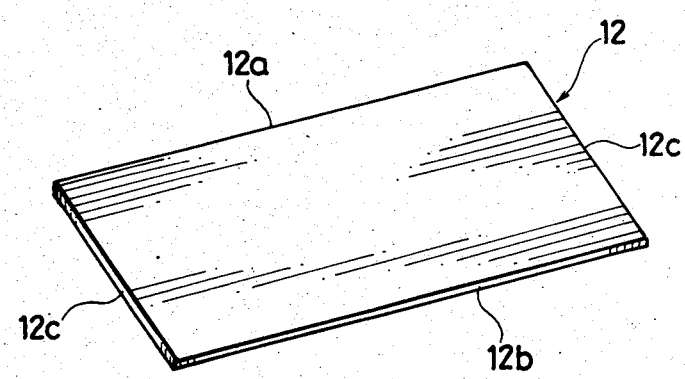
FIGS. 6-9 are perspective views of several embodiments of baffle or scoop means for use in the present invention.

The baffle plate 12 of the embodiment shown in FIG. 6 has a flat plate type construction, the planar configuration is a rectangular one comprised of a leading edge 12a, trailing edge 12b, and two side edges 12c. This baffle plate 12 can perform good coating operation because the tablets 6 can tumble on the flat surface thereof.

Figure 7:
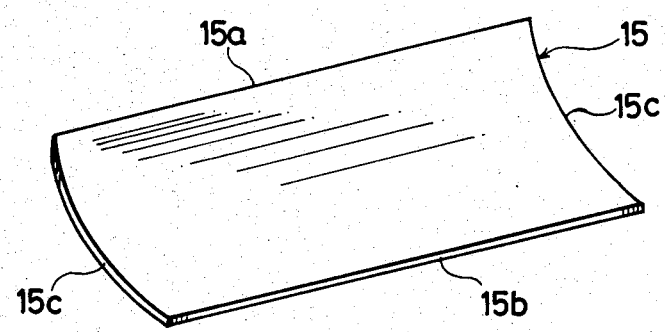

In the embodiment shown in FIG. 7, the baffle plate 15 has an arcuate plate type construction comprised of linear leading edge 15a and trailing edge 15b, and arcuate side edges 15c. According to this embodiment, since the baffle plate 15 is attached to the drum 1 in a posture wherein the plate 15 is curved along the arcuate configuration of the inner wall surface of the drum 1, namely in the condition wherein the plate 15 has a curvature along the tumbling direction of the tablets 6, the tablets 6 are tumbled smoothly on the arcuate surface of the baffle plate 15 to promote very efficient coating operation.

Figure 8:
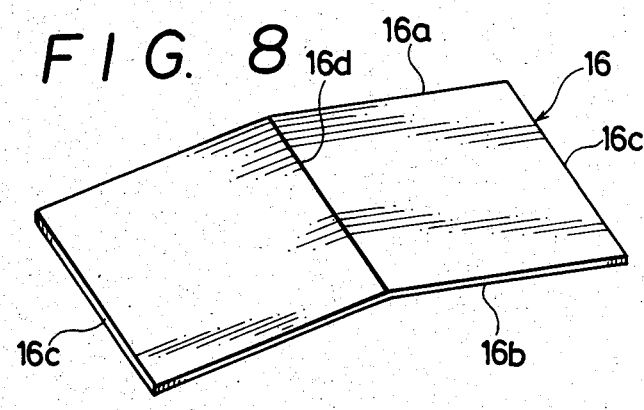

In the embodiment shown in FIG. 8, the baffle plate 16 has a bended plate type construction in which the plate 16 is bent upwardly at the bend portion 16d intermediate of longer edges.

Figure 9:
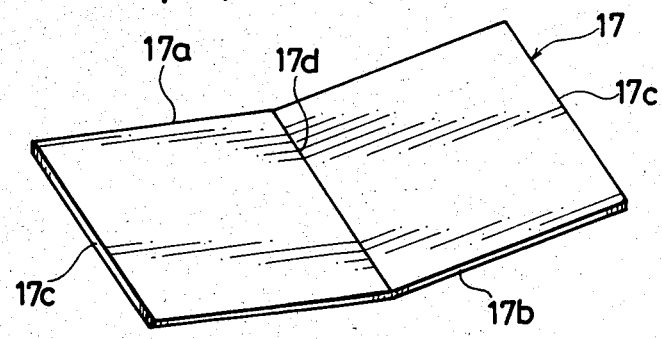

In the embodiment shown in FIG. 9, there is shown a baffle plate 17 bent downwardly at the bend portion 17d intermediate of longer edges.

According to the baffle plates 16 and 17, it is possible to reduce the crack and noise of the tablets 6.

Figure 10:
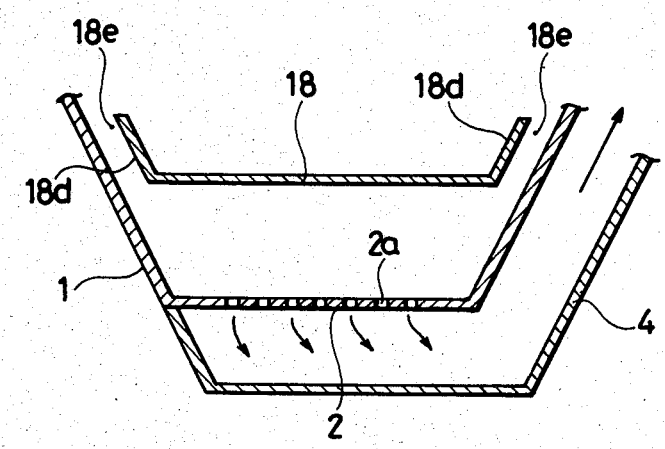
FIGS. 10 and 11 are partial front sectional views of other embodiments of the baffle means for use in the present invention.

In the embodiment shown in FIG. 10, the baffle plate 18 has a trough-like construction wherein side plates 18d are provided at both of the side edges of the baffle plate 18 in order to prevent the tablets 6 being coated from falling down from the side edges thereof. Between each outer surface of the side plates 18d and the inner wall surface of the drum 1, gap 18e is formed. Therefore, the hot gas can pass through this gap 18e toward the perforated area 2 to form ventilating openings between the side edges of the baffle plate 12 and the inner surface of the drum 1.

In other way, the angle of the side wall plates 18d may be made steeper than that shown in FIG. 10, the lower edges of the side wall plates may contact with the inner surface of the drum 1, or the distance between both of the side wall plates 18d may be made to become narrower gradually toward the trailing edge of the plates.

Figure 11:
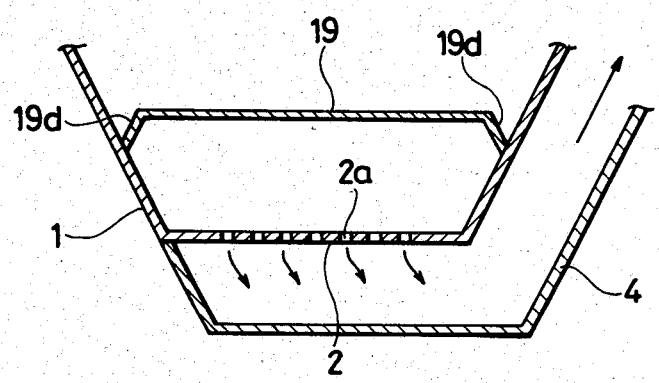

The baffle plate 19 in the embodiment shown in FIG. 11 has side wall plates 19d extending downwardly and outwardly (radially outwardly of the drum 1) at both of side edges thereof, the lower edges of the side wall plates 19d contact with the inner wall surface of the drum 1. The lower edges of the side wall plates 19d and the inner wall surface of the drum 1 may be fixed with each other by welding etc., or may not necessarily be fixed directly to prevent the tablets 6 from leaking through therebetween toward the perforated area 2.

The baffle plate may have any constructions other than those shown in the above embodiments.

Figure 12:
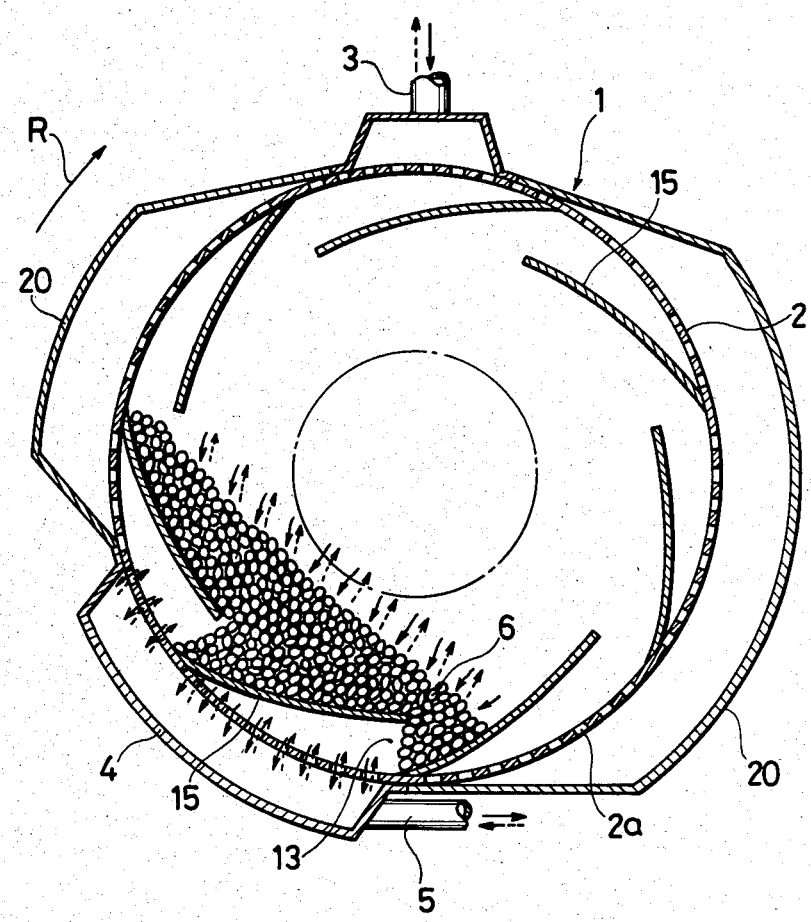
FIGS. 12 and 13 are general front sectional views of other embodiments of the tablet coating apparatus according to the present invention.

FIG. 12 is a front sectional view of other embodiment of the tablet coating apparatus in accordance with the present invention.

In this embodiment, the coating drum 1 has entirely perforated construction wherein a plurality of ventilating aperture 2a are provided at the whole circumference of the drum 1, and the outside of perforated area 2 is covered by casings 20 except for the inlet and outlet portions for the hot gas. The inside of the perforated area 2 of the drum 1 is covered entirely by a plurality of, seven in the illustrated embodiment, arcuate type baffle plates 15.

According to this embodiment, by the complex action obtained from the tumbling and showering movements of the tablets 6 by means of the baffle plates 15, it is possible to dry the tablets 6 efficiently and prevent the blocking of the ventilating apertures 2a of the perforated area 2 to obtain uniform and homogeneous coated products.

Figure 13:
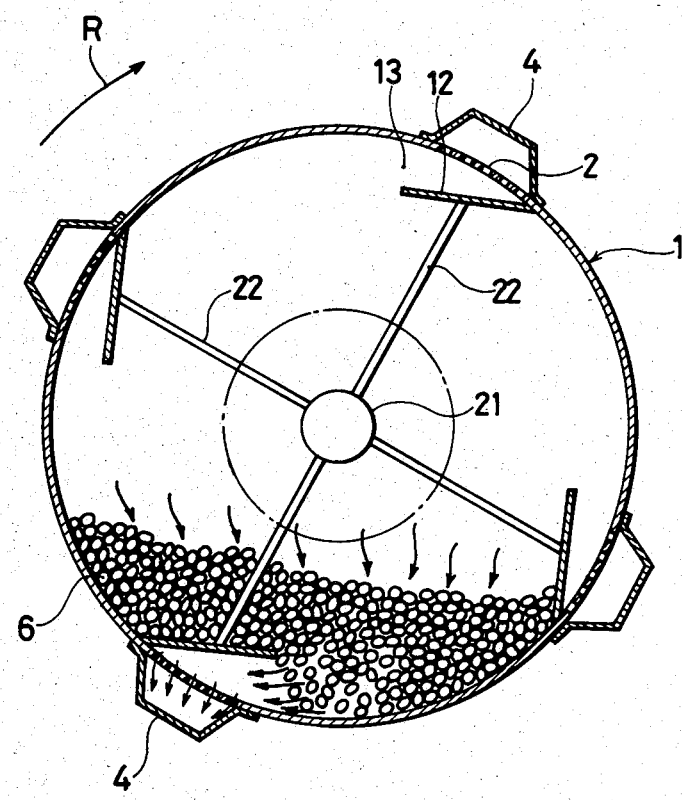

FIG. 13 shows a front sectional view of another embodiment of the tablet coating apparatus in accordance with the present invention.

In this embodiment, each baffle plate 12 is fixed to the free end of a holding bar 22 arranged radially on a holding shaft 21 provided axially to rotate together with the coating drum 1 therein. Therefore, the baffle plate 12 is held positively from inside of the drum 1 by the holding shaft 21 and holding bar 22, and is not fixed directly to the inner surface of the drum 1. But, if desired, the baffle plate 12 may also be fixed to the inner surface of the drum 1 by welding etc.

Figure 14:
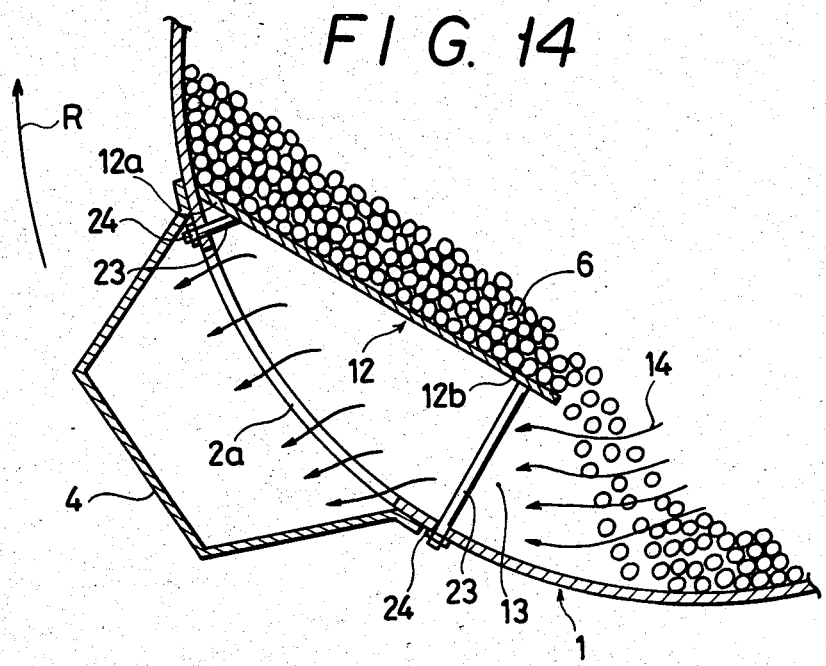
FIGS. 14-16 are enlarged partial sectional views of other several embodiments of the apparatus according to the present invention.

FIG. 14 is a partial sectional view of other embodiment of the tablet coating apparatus according to the present invention.

In this embodiment, the baffle plate 12 is held by bolts 23 at the leading and trailing portions thereof, the outer end of each bolt 23 is fastened from the outer side of drum 1 by a nut 24. Therefore, in this embodiment, since the attachment and detachment of the baffle plate 12 is easy and the cleaning thereof is easy, it is possible to use this embodiment advantageously even if sanitary requirements etc. are severe.

Further, in this embodiment, the ventilating area is formed as a single large ventilating aperture 2a, not as a perforated area 2 in said embodiment, by utilizing the fact that the tablets 6 do not contact with the ventilating area. Therefore, resistance to the ventilation of the hot gas flowing through the ventilating aperture 2a is reduced materially to shorten the drying time, to reduce the power of the blower for ventilation and the running cost thereof. Furthermore, according to this embodiment, when the coated products are discharged from the drum 1, the products can be discharged through the ventilating aperture 2a only by rotating the coating drum 1 in the reverse direction relative to the coating direction R.

Figure 15:
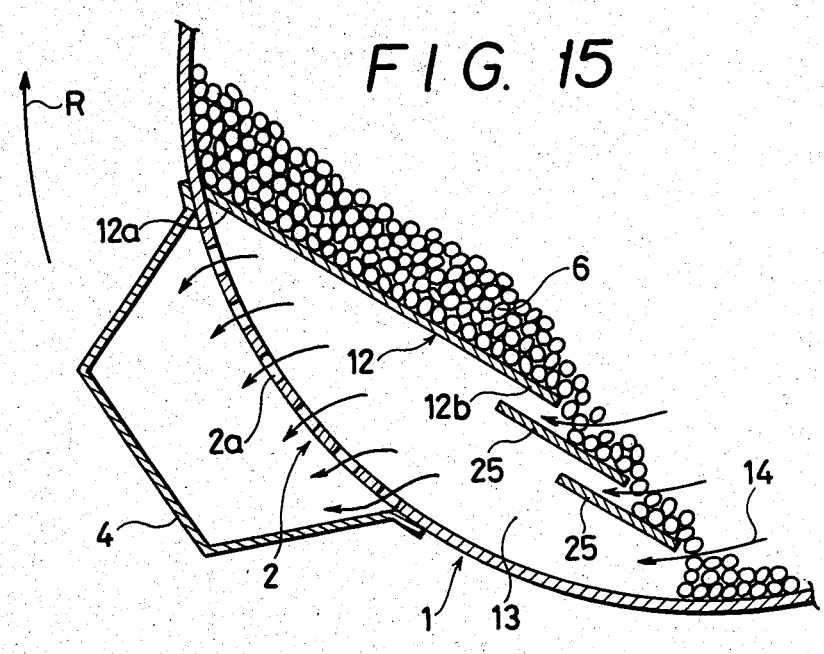

FIG. 15 is a partial front sectional view showing another embodiment of the tablet coating apparatus in accordance with the present invention.

At the ventilating opening 13 between the trailing edge 12b of the baffle plate 12 in this embodiment and the inner wall of the drum 1, there are provided two additional or auxiliary plates 25 which are arranged substantially in parallel with the baffle plate 12 to form a cascade-like stepwise structure in the reverse direction relative to the rotational direction R, namely counterclockwise from the trailing edge 12b of the baffle plate 12.

Therefore, in this embodiment, the tablets 6 raised up and tumbled on the baffle plate 12 are dropped on the upper auxiliary plate 25 in showering movement by gravity from the trailing edge 12b of the baffle plate 12, then, after tumbled on the upper auxiliary plate 25, the tablets 6 are dropped on the lower auxiliary plate 25 in showering movement by gravity and tumbled on the lower auxiliary plate. Thereafter, the tablets 6 are fallen down on the inner wall surface of the drum 1 in showering movement by gravity from the trailing edge of the lower auxiliary plate 25, and tumbled on the inner wall surface of the drum 1, then raised up by the next baffle plate 12 to be processed in the same way as described above.

As a result, according to this embodiment, the tablets 6 are given three times of complex action of the tumbling and showering movement until the tablets 6 are dropped on the inner wall surface of the drum 1 from the baffle plate 12 via two additional or auxiliary plates 25, 25 in cascade-like stepwise. Therefore, the contact time between individual tablet 6 and the hot gas 14 becomes so long that the drying efficiency is improved. Also, it is possible to obtain more homogeneous products by uniform drying.

The number of the additional or auxiliary plate 25 may be one or more than two.

Figure 16:
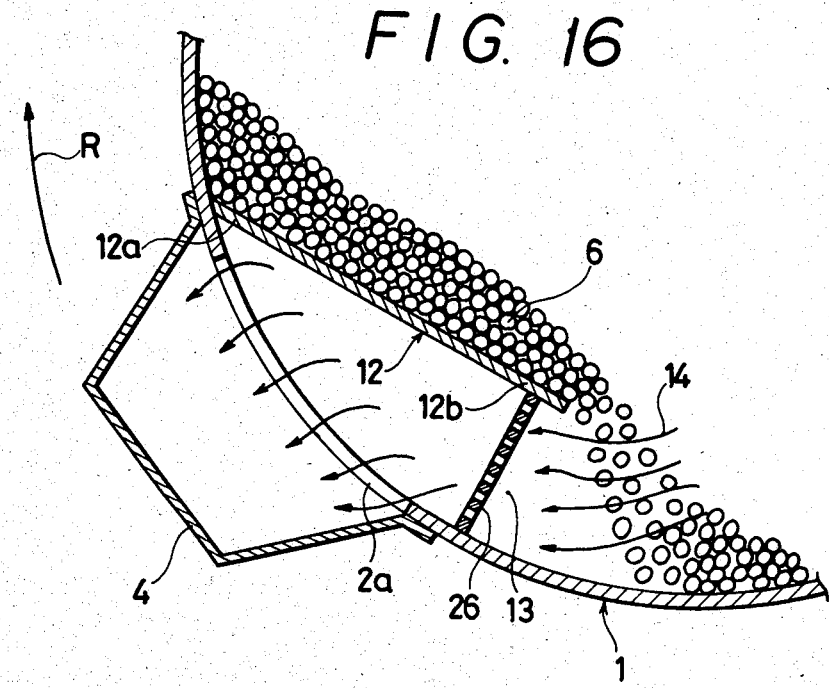

FIG. 16 shows another embodiment of the tablet coating apparatus in accordance with the present invention.

In this embodiment, the ventilating area of the coating drum 1 is not consisted of perforated structure, but is formed by one ventilating aperture 2a like that of the above described embodiment shown in FIG. 14. Moreover, a ventilating plate 26 comprised of a perforated plate is provided in the ventilating opening formed between the trailing edge 12b of the baffle plate 12 and the inner wall surface of the drum 1.

Therefore, according to this embodiment, by providing the ventilating plate 26 in the ventilating opening 13, it is possible to prevent the tablets 6 or other materials from leaking out through the ventilating opening 13 and the ventilating aperture 2a.

The ventilating plate 26 may be formed by a mesh etc. other than the perforated plate. The ventilating aperture 2a may be replaced by the perforated area 2 entirely or partially.

Figure 17:
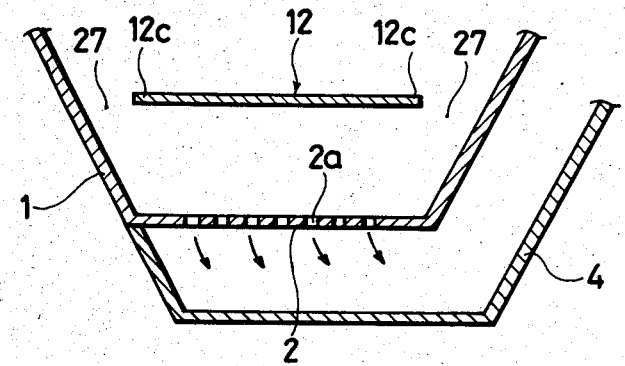
FIG. 17 is a partial side sectional view showing another embodiments according to the present invention.

FIG. 17 shows a partial sectional view of further embodiment of the tablet coating apparatus in accordance with the present invention.

The baffle plate 12 in this embodiment has a flat plate type structure, and forms gaps 27 between both of the side edges 12c of the plate 12 and the side portion of the inner wall surface of the drum 1 to provide ventilating opening between the side edges 12c and the inner wall of the drum 1.

Therefore, in this embodiment, the tablets 6 raised up and tumbled on the baffle plate 12 are fallen down in showering movement, not only from the trailing edge 12b of the baffle plate 12, but also from the side edges 12c so as to be dried efficiently by the hot gas passing through the gaps 27 between the side edges 12c and the inner wall of the drum 1.

Further, in this embodiment, it is possible to ventilate the gas only through the gaps formed between the side edges 12c and the inner wall of the drum 1 by providing a non-perforated plate (not shown) between the trailing edge 12b of the baffle plate 12 and the inner wall of the drum. Also, it is possible to provide a ventilating plate 26 such as that shown in FIG. 16 at the trailing edge 12b and/or one or both of the side edges 12c.

It is to be understood that the present invention is not limited to the above described embodiments, the present invention may be embodied in other specific forms without departing from the spirit and scope defined in the appended claims.

The present invention may be applied not only to the conical drum type coating apparatus, but also to cylindrical, onion, or pear shaped drum type coating apparatus etc.

Furthermore, the present invention may be applied to many fields of coating other than the tablet as described above, for example, foods, feedstuffs, agricultural medicines, manures, toner etc. If desired, the present apparatus may be used for granulation.

The results of experiments performed by the present inventors on the tablet coating apparatus of the present invention are shown in the following in comparison of the prior apparatus.

EXAMPLE 1

30 kgs of raw tablets (vitamin content 200 mg/tab.) were charged into a conventional coating apparatus shown in FIG. 1, the diameter and width of the coating drum thereof were 1000 millimeters and 780 millimeters respectively. The drum was rotated at the rotational speed of 12 r.p.m., and 40 kgs of coating solution (sugar 39%, distilled water 22.7%, talc 15%, precipitated calcium carbonate 21.5%, gum arabic 1.4%, gelatin 0.4%) was sprayed by twenty five times at the speed of 1 l/min, and hot air heated to 60° C. was supplied at the flow rate of 20 Nm$^3$/min for sugar coating. However, in this sugar coating, since the ventilating apertures were blocked, the flow rate of hot air was reduced. As a result, it took about five hours to obtain dried products of 340 mg/tab.

On the contrary, the same coating apparatus provided with, at the ventilating area thereof, the baffle plate shown in FIGS. 3 and 4 according to the present invention was used for sugar coating in accordance with the present invention. While the coating drum of this apparatus was rotated at the rotational speed of 12 r.p.m., 30 kgs of raw tablets having the same composition as that used in the above experiment were charged and 40 kgs of coating solution which had the same composition as that used in the above experiment was sprayed by twenty times at the flow rate of 1.25 l/min, and hot air heated to 60° C. was supplied at the flow rate of 20 Nm$^3$/min for sugar coating. In this sugar coating, since the ventilating apertures were not blocked, the flow rate of the hot gas was maintained in stable condition. As a result, it took only about four hours to obtain the coated products of 340 mg/tab. Therefore, sugar coating time was materially shortened.

EXAMPLE 2

280 kgs of raw tablets were charged into a conventional coating apparatus shown in FIG. 1, the diameter and width of the coating drum thereof were 1700 millimeters and 1200 millimeters respectively. While the drum was rotated at the rotational speed of 9 r.p.m., 50 lit. of aqueous coating solution ("METHOCEL" E-15 manufactured by Dow Chemical Co. 4.5%, PEG #6000 manufactured by Sanyo Chemical Industries Co., Ltd. 0.6%, J.P.X. silicic anhydride 0.2%, purified water 94.7%) was sprayed at the rate of 500 ml/min, and hot air heated to 86° C. was supplied at the flow rate of 50 Nm$^3$/min for film coating. As a result, since the ventilating apertures were blocked to reduce the flow rate of the hot air, it took about 110 minutes until the drying was finished.

On the contrary, the same coating apparatus provided with, at the ventilating area thereof, the baffle plate shown in FIGS. 3 and 4 according to the present invention was used for film coating in accordance with the present invention. While the coating drum of this apparatus was rotated, 280 kgs of raw tablets having the same composition as that used in the above experiment in this example 2 were charged into the drum and 50 lit. of coating solution having the same composition as that used in the above experiment in this example 2 was sprayed at the rate of 650 ml/min, and hot air heated to 86° C. was supplied at the flow rate of 50 Nm$^3$/min for film coating. As a result, there occurred no blocking of the ventilating apertures, thereby film coating could have performed under the stable flow rate of the hot air, and the drying was finished in about eighty five minutes.

EXAMPLE 3

50 kgs of raw tablets were charged into a conventional coating apparatus shown in FIG. 1, the diameter and width of the coating drum thereof were 1000 millimeters and 780 millimeters respectively. While the drum was rotated, 4.1 kgs of coating solution (gelatin 4.7%, gum arabic 1.9%, granulated sugar 56.1%, purified water 37.3%) was sprayed onto the raw tablets at the mean spraying rate of 575 ml/min by the spraying time of 8 minutes, and 6.5 kgs of powdery material (precipitated calcium carbonate 80%, J.P.X. talc 10%, powdered sugar 10%) was supplied at the mean supply rate of 305 g/min by the supply time of 21 minutes for film coating. However, because 1915 grams (about 30%) of the powdery material leaked through the ventilating apertures into the exhaust duct, it was impossible to obtain uniform products, so that the coating operation was stopped.

On the contrary, coating apparatus of the same size as that used in the experiment in this example 3 was used, which apparatus was provided with, at the ventilating area thereof, the baffle plate shown in FIGS. 3 and 4 according to the present invention. While the coating drum was rotated, 50 kgs of raw tablets, 4.1 kgs of coating solution, and 6.4 kgs of powdery material, all of which has the same composition as those used in the above experiment in this example 3 were supplied under the same conditions as those of the above experiment for coating, and hot air heated to 82° C. was supplied at the flow rate of 25 Nm$^3$/min for drying the coated tablets. In this experiment, leak of powdery material was only about thirteen grams, and it was possible to obtain homogeneous coated products in about fifty minutes.

As described above, according to the present invention, it is possible to prevent blocking of the ventilating area, to improve the efficiency of drying, and to obtain homogeneous products. Further, it is possible to use actually the powder addition method wherein a portion of the coating solution is replaced by powder.

What is claimed is:

1. An apparatus for applying a coating on tablets or the like comprising a rotatable coating drum and at least one ventilating area provided in the wall of said drum, characterized in that an imperforate baffle means at least coextensive with the ventilating area for covering said ventilating area from inside of said drum is provided in said drum which does not permit tablets to fall on a wall portion extending below the baffle but which causes said tablets to fall onto said drum wall adjacent said ventilating area, the leading edge of said baffle means relative to the rotational direction of said drum is substantially in contact with the inner wall surface of said drum, and an unobstructed ventilating opening and an unobstructed path are defined between at least one of the trailing edge or side edges of said baffle means and the inner wall surface of said drum whereby tablets introduced in the drum fall from said baffle to said drum wall along said unobstructed path as said drum is rotated.

2. The apparatus according to claim 1, wherein said baffle means is comprised of a flat plate.

3. The apparatus according to claim 1, wherein said baffle means is comprised of a non-linear plate relative to the axial direction of said drum.

4. The apparatus according to claim 1, wherein said baffle means is provided with side wall plates extending away from the inner wall surface of said drum.

5. The apparatus according to claim 1, wherein said baffle means is provided with side wall plates extending toward the inner wall surface of said drum.

6. The apparatus according to claim 1, wherein the distance between the trailing edge of said baffle means and the inner wall surface of said drum at said ventilating opening is from one-fifth to one-fifteenth of the diameter of said drum.

7. The apparatus according to claim 1, further comprising at least one auxiliary plate provided stepwise toward rear side of said baffle means in said ventilating opening.

8. The apparatus according to claim 1, further comprising a ventilating plate provided in said ventilating opening.

9. The apparatus according to claim 8, wherein said ventilating plate is comprised of a perforated plate.

10. The apparatus according to claim 8, wherein said ventilating plate is comprised of a mesh.

11. The apparatus according to claim 8, wherein said ventilating area of said drum is comprised of at least one ventilating aperture having size larger than the tablets or the like to be coated.

12. The apparatus according to claim 8, wherein said drum is provided with a plurality of ventilating apertures at substantially whole circumference of said drum.

13. The apparatus according to claim 1, wherein said baffle means is fixed by welding to the inner surface of said drum.

14. The apparatus according to claim 1, wherein said baffle means is held in said drum by separated holding means.

15. The apparatus according to claim 14, wherein said holding means is comprised of at least one holding bolt attached at one end to the inner wall of said drum and at the other end to said baffle means.

16. The apparatus according to claim 14, wherein said holding means is comprised of at least one holding bar attached at one end to a holding shaft arranged in the center of said drum and at the other end to said baffle means.

17. The apparatus according to claim 1, further comprising at least one gap formed between one or both of the side edges of said baffle means and the inner surface of said drum.

18. The apparatus according to claim 1, wherein said baffle means is comprised of an arcuate plate curved in the rotational direction of said drum.

* * * * *